June 10, 1941.  E. D. LILJA  2,245,039
TENSION MEASURING DEVICE
Filed March 13, 1939
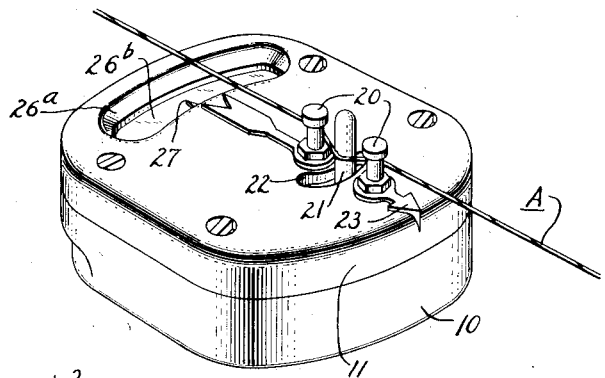
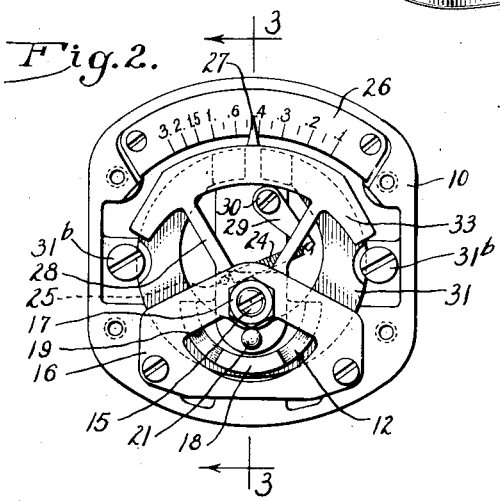
INVENTOR
Edgar D. Lilja
BY
Parker, Carlson, Pitzner & Hubbard
ATTORNEYS Patented June 10, 1941

2,245,039

UNITED STATES PATENT OFFICE 2,245,039

TENSION MEASURING DEVICE

Edgar D. Lilja, Rockford, Ill., assignor to Barber-Colman Company, Rockford, Ill., a corporation of Illinois Application March 13, 1939, Serial No. 261,415

3 Claims. (Cl. 265—1.6)

The invention relates to devices for measuring the tension in a traveling strand and more particularly to devices incorporating electrical means for damping out vibrations.

The general object is to provide a tension measuring device having a magnetic damping means which is of simple and rugged construction and contributes to the accuracy of the tension measurement.

Further objects and advantages of the invention will become apparent as the following description proceeds, taken in connection with the accompanying drawing, in which Figure 1 is a perspective view of a tension measuring device embodying the invention, the device being shown as applied to a traveling yarn strand.

Fig. 2 is a plan view of the device of Fig. 1 with the cover removed.

Fig. 3 is a longitudinal vertical sectional view of the device of Fig. 1, the section being taken along the line 3—3 in Fig. 2.

Fig. 4 is an enlarged detail perspective view of a brake magnet and its associated parts included in the device of Fig. 1.

Fig. 5 is an enlarged detail perspective view of an alternative form of brake magnet which may be substituted for that of Fig. 4.

The invention has been exemplified herein as embodied in a portable unit suitable for measuring the tension in a traveling strand of yarn A as, for example, in the course of winding or unwinding the yarn in various operations in a textile mill. Although this particular embodiment of the invention has been shown and described herein in some detail for purposes of illustration and explanation, there is no intention to thereby limit the invention to such embodiment, but, on the other hand, the appended claims are intended to cover all modifications and alternative constructions falling within the spirit and scope of the invention.

The unit of Fig. 1 has been shown as housed within a sectional casing embodying a shallow cup-shaped bottom section 10 provided with a removable cover or top section 11 which is screwed to it. To avoid interference with the action of a magnetic device included in the unit as is hereinafter described, the casing sections 10—11 are preferably made of non-magnetic material and may be economically molded from synthetic resin.

The tension measuring mechanism within the casing 10—11 is of the resistor spring type and embodies a movable member or rotor 12 of semi-circular shape fixed on a pivot pin 13. This pin (Fig. 3) has pointed ends journaled in bearings 14 and 15 respectively fixed in the bottom casing section 10 and threaded in a frame plate 16, the bearing 15 being held in adjusted position by a lock nut 17. The frame plate 16 (Fig. 2) is screwed to the top of the casing section 10. It will thus be seen that the rotor 12 is oscillatable about the axis of the pin 13. The arc of oscillation is limited, however, by a stop arrangement comprising an upwardly projecting lug 18 on the rotor 12 and which is received in an arcuate slot 19 in the frame plate 16, the ends of the slot defining limit stops.

The rotor 12 is caused to move about its pivotal axis through an arc proportional to the tension in the yarn strand A. For this purpose, the yarn is threaded through a grid (Fig. 1) formed by a pair of upright posts or guides 20 fixed to the cover 11 and an intermediate post 21 fast on the rotor 12 and projecting through an arcuate slot 22 in the casing cover. Enlarged heads serve to hold the thread on the posts 20. An arrow 23 molded on the cover 11 indicates the direction of yarn travel. With the yarn strand A led alongside the posts 20 and around the opposite side of the movable post 21 in the manner shown in Fig. 1, it will be apparent that an increase in strand tension tends to swing the post 21 and hence the rotor 12 in a counter-clockwise direction (as viewed in Figs. 1 and 2). Such movement is yieldably resisted, however, by a contractile spring 24 stretched between a pin 25 on the rotor 12 and an adjustable arm 29. Consequently, as the tension in the yarn strand A is increased, the rotor 12 is swung proportionally further in a counter-clockwise direction and similarly upon a subsequent decrease in strand tension, the spring 24 returns the rotor in a clockwise direction.

A visual indicator arranged to be actuated by the rotor 12 has been shown herein as including a stationary scale 26 and a cooperating movable pointer 27. The scale 26 may be suitably graduated as, for example, in ounces in accordance with the manner in which the displacement of the rotor 12 varies with changes in the yarn tension, as evidenced by the non-uniform character of the scale. The latter is located beneath a registering slot 26ª in the cover 11 which is closed by a glass 26ᵇ. The pointer 27 has been shown as an integral extension on a metal plate 28 fast on the rotor 12 and constituting, as is hereinafter explained in greater detail, a part of the rotor damping mechanism.

To facilitate adjustment of the spring 24 so as to calibrate the instrument while minimizing minimum and maximum scale error, the adjustable arm 29 is pivoted on the lower casing section 10 and is held in its adjusted position by a screw 30. By changing the position of the arm 29, the tension in the spring 24 can, of course, be readily adjusted. With the arrangement shown, when there is no tension on the yarn strand A, the rotor post 21 is at the left hand extremity of its path of movement and the pointer 27 is at the right hand end of the scale 26. If tension is applied to the yarn strand A, the rotor 12 will be pulled counter-clockwise against the yielding resistance of the spring 24 and through a distance dependent upon the yarn tension. Consequently, the position of the pointer 27 on the scale 26 will at all times indicate the yarn tension. Furthermore, the yarn strand can travel lengthwise freely through the grid formed by the posts 20 and 21 so that no interruption in the yarn movement is occasioned by the measuring operation.

It will be apparent that with the arrangement so far described, any sudden jerking or rapid changes in tension will cause the rotor 12 to oscillate and render it difficult to obtain a satisfactory reading of the indicator. This condition of sudden irregularities in tension is one which is likely to occur, however, in many instances and particularly when a yarn strand is being unwound from a cheese or package of yarn in such manner that loops are likely to be thrown off. Accordingly, the invention contemplates the provision of means particularly suited to the conditions encountered in service use of the indicator and operable effectively to damp the movement of the shiftable indicator element or pointer 27. In the present instance, this means comprises an eddy current brake type of damping mechanism which serves to damp out more or less momentary fluctuations of indicator movement without impairing the accuracy of registration of steady state conditions. The dampener also functions automatically to vary the damping action in accordance with the prevailing tendency of the indicator to vibrate with tension changes in the strand.

To provide for structural simplicity and compactness, the damping mechanism is of special construction and associated in a novel way with the other parts of the instrument. Herein, it comprises a permanent magnet 31 in the form of a loop with its ends spaced apart on one side of the loop and forming pole faces disposed in inductive relation with respect to a member 33 of non-magnetic and conductive material carried by and movable with the rotor plate 28. In the form shown in Figs. 2 to 4, the ends 32ª and 32ᵇ of the magnet which constitute pole pieces are spaced apart circumferentially and are turned outwardly to provide pole faces generally paralleling the plane of the magnet loop. To localize the flux in the pole pieces and avoid leakage, the ends of the magnet are beveled as indicated at 31ª. The magnet loop is fastened by screws 31ᵇ in the casing section 10 and is offset from the rotor axis so that the latter is disposed adjacent the side of the loop diametrically opposite from the poles preferably within the magnet loop. Preferably, the magnet is composed of a material sold under the trade name of "Alnico" which possesses high coercive force and may be strongly magnetized.

The inductor member 33 comprises a segmental extension of the rotor plate 28 lying closely adjacent the faces of the poles 32ª and 32ᵇ and overlapping the latter. The magnetic circuit between the pole pieces 32ª and 32ᵇ is completed through a keeper or bridge fashioned of magnetic material in the form of a segmental plate 34 screwed to the cover 11 (Fig. 3) and having pole piece projections 35ª and 35ᵇ (Fig. 4) with faces registering with and opposed to the pole pieces 32ª and 32ᵇ and lying alongside the inductor plate closely adjacent the latter.

With the arrangement shown in Fig. 4, the major portion of the magnetic flux follows the path indicated by the line of arrows 36. In the event that the pole piece 32ª is a north pole and the pole piece 32ᵇ a south pole, the flux passes from the north pole 32ª through the inductor 33 and into the opposed pole piece 35ª, thence to the other keeper pole piece 35ᵇ, and back through the inductor 33 to the magnet's south pole piece 32ᵇ. Clockwise motion of the inductor member 33, relative to this flux, induces eddy currents in the member which react with the flux and follow roughly the orbital paths indicated by the lines of arrows 37. The eddy currents thus set up resist relative motion between the inductor member 33 and the associated magnet structure in a manner well understood in the art so that oscillatory or other transitory movements of the indicator pointer 27 are damped effectively. The magnitudes of the eddy currents will be in proportion to the rapidity of oscillation of the inductor plate so that the degree of damping will increase with an increase in the tendency of the indicator to vibrate.

In the operation of the device, a traveling strand, whose tension is to be measured, is slipped into position between the posts 20—21 in the manner of the yarn strand A in Figs. 1 and 3 with the direction of strand motion corresponding to the arrow 23. Thereafter, the strand pulls the rotor post 21 to the right or counter-clockwise against the resistance of spring 24 a distance proportional to the tension in the strand. Accordingly, a continuous visual indication of strand tension is afforded by the position of the pointer 27 on the scale 26. Furthermore, the pointer 27 shifts only with changes in mean or steady state value of the strand tension due to the damping or stabilizing effect of the eddy current brake so that there is no such substantial oscillation of the pointer as would otherwise result from sudden brief changes in tension. This makes the instrument usable for such purposes as the measurement of tension of yarn being unwound from a yarn package under conditions where loops are likely to be thrown off intermittently with consequent abrupt and brief changes in tension.

In Fig. 5, an alternative form of magnet 38 has been illustrated and which may be substituted for the magnet 31 of Fig. 4. No separate keeper or bridge such as the part 34 of Fig. 4 is required. The permanent magnet 38 is similar to magnet 31 heretofore described in that it is also of generally loop shaped configuration. It is spiraled somewhat, however, so that pole piece projections 39 formed on its ends are spaced apart axially of the magnet rather than circumferentially. With such an arrangement, the inductor member 33 may be received in the air gap between the opposed pole pieces 39. The flux threading the inductor member between these pole pieces reacts with the moving inductor member to produce eddy currents in the latter which react with the flux to resist its movement and accomplish the desired damping of the pointer motion in the same general manner as in the arrangement of Fig. 4.

It will be apparent from the foregoing that the damping mechanism, being of magnetic character, is not influenced by friction so that the magnitude of the damping action corresponds accurately to the tendency of the indicator to vibrate. By employing a ring-shaped magnet and locating the same as described relative to the pivotal axis of the indicator member, the magnet may be dimensioned properly while maintaining a high degree of compactness in the parts of the instrument.

I claim as my invention:

1. A device for measuring the tension in a traveling strand comprising, in combination, a stationary permanent magnet comprising a bar of permanently magnetized material forming a loop having its ends spaced apart circumferentially and providing pole faces spaced circumferentially and facing laterally of the loop, a magnetic bridge disposed alongside said magnet ends and overlapping but spaced laterally from said faces, a non-magnetic and electrically conductive inductor member pivotally mounted for movement generally parallel to the plane of the loop and longitudinally of the gap between said bridge and said pole faces with the flux through said gap threading said inductor member, whereby the movements of said inductor member are damped as a result of the eddy currents induced therein, an indicator arm swingable alongside said loop with said inductor member, means yieldably urging said indicator arm in one direction, and means including a projection on said inductor member engageable with a traveling strand to cause said arm to be deflected a distance proportional to the tension in the strand opposing said yieldable means.

2. A device for measuring the tension in a traveling strand comprising, in combination, a stationary permanent magnet in the form of a loop with the ends disposed adjacent each other and providing pole faces facing laterally of the loop, a non-magnetic and electrically conductive inductor member pivotally mounted for movement generally parallel to the plane of the loop and edgewise through the path of flux threading the gap between said pole faces, whereby the movements of said inductor member are damped as a result of the eddy currents induced therein, an indicator arm swingable alongside said loop with said inductor member, means yieldably urging said indicator arm in one direction, and means including a projection on said inductor member engageable with a traveling strand to cause said arm to be deflected a distance proportional to the tension in the strand opposing said yieldable means.

3. A device for measuring the tension in a traveling strand comprising, in combination, a stationary permanent magnet in the form of a loop with the ends overlapping each other circumferentially and providing pole faces facing laterally of the loop in opposed spaced relation, a non-magnetic and electrically conductive inductor member pivotally mounted for movement generally parallel to the plane of the loop through the gap between said pole faces with the flux through said gap threading said inductor member, whereby the movements of said inductor member are damped as a result of the eddy currents induced therein, an indicator arm swingable alongside said loop in unison with said inductor member, means yieldably urging said indicator arm in one direction, and means including a projection on said inductor member engageable with a traveling strand to cause said arm to be deflected a distance proportional to the tension in the strand opposing said yieldable means.

EDGAR D. LILJA.